United States Patent [19]
Tsai

[11] Patent Number: 5,261,590
[45] Date of Patent: Nov. 16, 1993

[54] STRUCTURE OF SOLDERING SYSTEM WITH SOLDER WIRE AUTOMATIC FEEDING MECHANISM

[76] Inventor: Danny Tsai, 1 Fl., No. 27, Lane 210, Ching Hsin St., Chungho, Taipei Hsien, Taiwan

[21] Appl. No.: 858,423

[22] Filed: Mar. 24, 1992

Related U.S. Application Data

[63] Continuation of Ser. No. 544,730, Jun. 27, 1990, abandoned.

[51] Int. Cl.⁵ .................................................. B23K 1/00
[52] U.S. Cl. ............................................. 228/41; 228/55
[58] Field of Search .............................. 228/33, 41, 55, 51, 228/52, 40, 240; 403/55, 54, 56; 248/276

[56] References Cited

U.S. PATENT DOCUMENTS

| | | | |
|---|---|---|---|
| 2,296,158 | 9/1942 | Gardner | 228/52 |
| 2,327,715 | 9/1943 | Ingerson | 228/244 |
| 3,255,944 | 6/1966 | Yadron | 228/25 |
| 3,509,436 | 4/1970 | Hovance | 228/27 |
| 3,910,538 | 10/1975 | Bartella | 248/276 |
| 4,236,844 | 12/1980 | Mantele | 403/55 |
| 4,320,884 | 3/1982 | Leo | 403/56 |
| 4,431,329 | 2/1984 | Bartella | 248/276 |

*Primary Examiner*—Richard K. Seidel
*Assistant Examiner*—James Miner

[57] ABSTRACT

Disclosed is a structure of soldering system with solder wire automatic feeding mechanism, which comprises a first cardan arm for holding a soldering iron and a second cardan arm for holding a solder wire feeding unit. The cardan arms are each comprised of three joints. A swivel knob is fastened in each cardan are to adjustably control the positioning of the soldering iron or the solder wire feeding unit. The solder wire feeding unit comprises a feeder head revolvably attached to a feeder holder so that the feeding angle of solder wire can be conveniently adjusted.

3 Claims, 7 Drawing Sheets

STRUCTURE OF SOLDERING SYSTEM WITH SOLDER WIRE AUTOMATIC FEEDING MECHANISM

This application is a continuation application of application Ser. No. 07/544,730, filed Jun. 27, 1990 now abandoned.

BACKGROUND OF THE INVENTION

The present invention is related to soldering systems and more particularly to a soldering system which comprises two cardan arms for holding a soldering iron and an automatic solder wire feeding unit.

In manufacturing electronic products, electronic components are generally connected to a circuit board or a member by means of soldering process. During soldering, it is very difficult to hold a member to solder while a solder wire and a soldering iron are respectively held in both hands. If a soldering system is used, the feeding of solder wire is still a problem to settle. According to conventional soldering system, the feeding angle and the position of a solder wire feeding device and the position of a soldering iron can not be conveniently adjusted according to requirement. The present invention is specifically designed to settle these problems. According to the present invention, the position and direction of a soldering iron and a solder wire feeding unit can be conveniently adjusted so that high performance of soldering operation can be achieved.

SUMMARY OF THE INVENTION

According to one aspect of the present invention, a soldering system comprises a pair of cardan arms respectively for holding a soldering iron and a solder wire feeding unit. The cardan arms are each comprised of three universal joints and one swivel knob. The relative positioning of the three universal joints of each cardan arm is controlled by means of the operation of the swivel knob so that the soldering iron or the solder wire feeding unit can be adjusted to a desired position.

According to another aspect of the present invention, a soldering system comprises a solder wire feeding unit having a guide spring to flexibly direct a solder wire into position for feeding. The solder wire feeding unit comprises a feeder head revolvably attached to a feeder holder so that the feeding angle of solder wire can be conveniently adjusted through an angle of 360.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
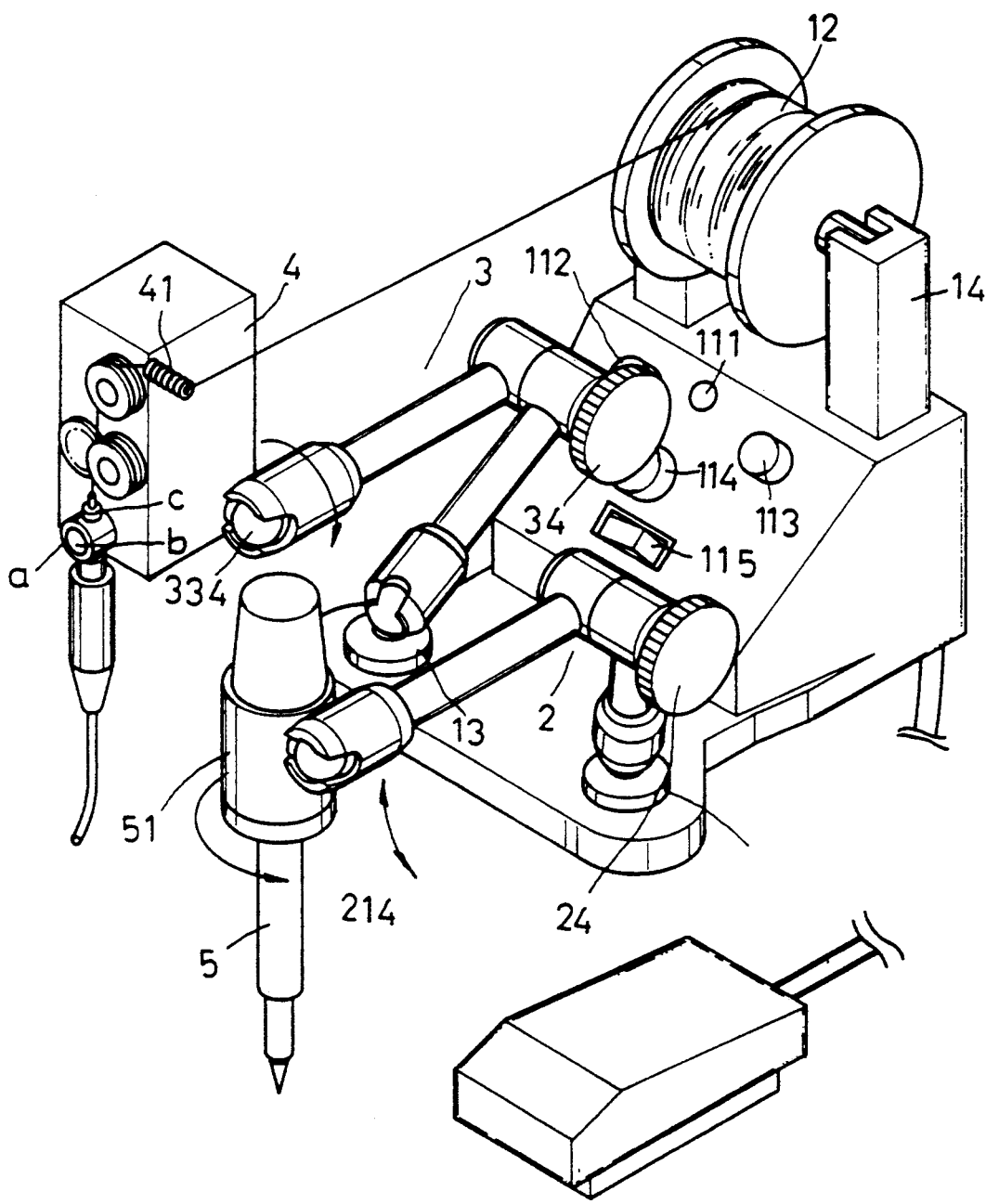
FIG. 1 is a perspective fragmentary view thereof.
Figure 2:
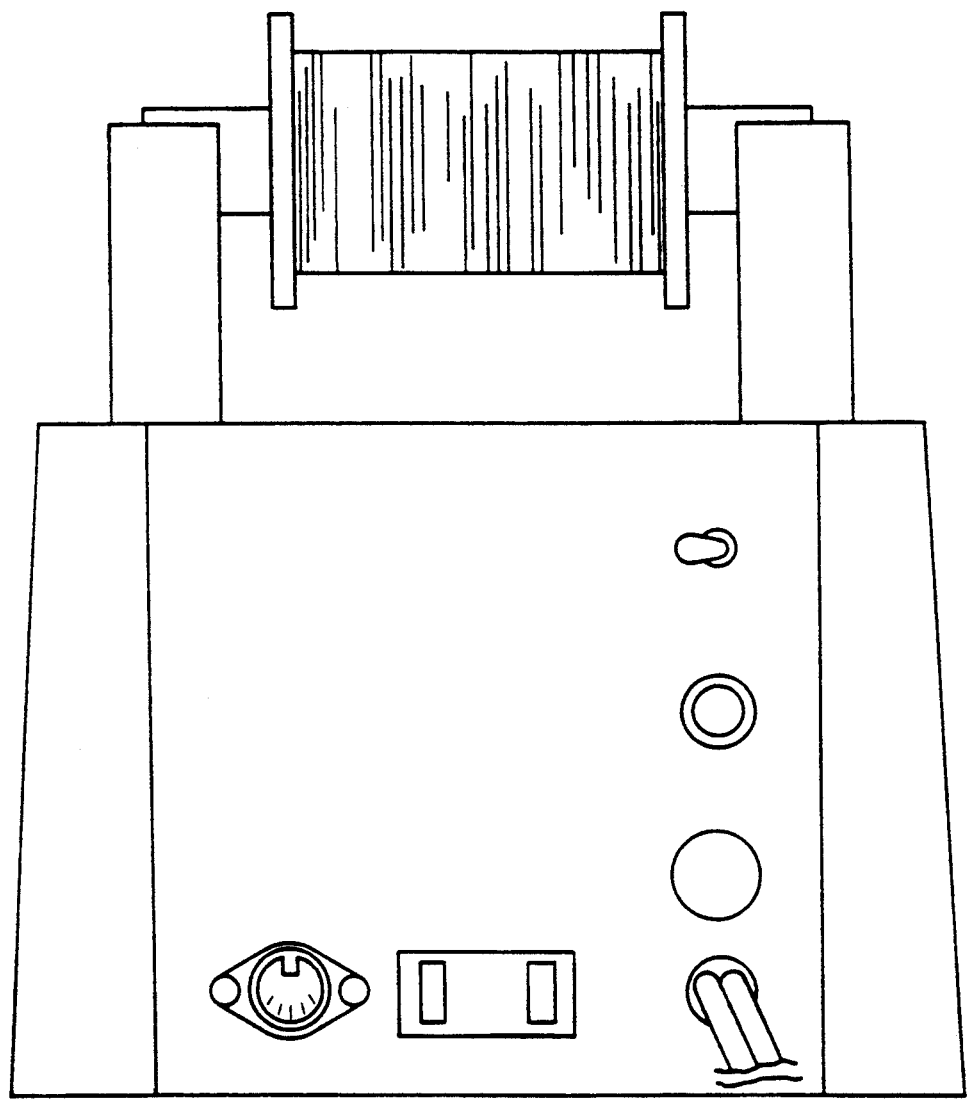
FIG. 2 is a back view thereof.

Referring to FIGS. 1 and 2, there is illustrated a soldering system embodying the present invention and generally comprised of a base 1, two cardan ares 2, 3, a solder wire feeding unit 4 and an electrical soldering iron 5.

As illustrated, the base I comprises a control panel 11 at the front, having mounted thereon a power indicator light 111, a feeding speed regulating knob 112, a feeding volume regulating knob 113, a soldering iron temperature control knob 114 and a power switch and soldering iron indicating light 115; and a solder wire reel mounting seat 14 at the top for mounting a solder wire reel 12.

Figure 3:
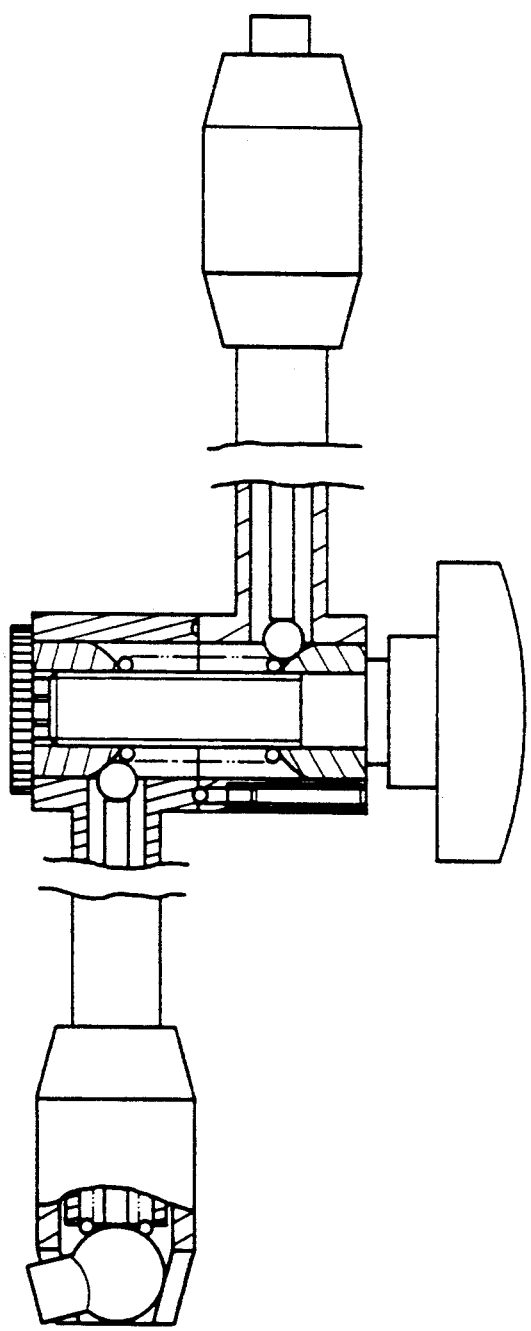
FIG. 3 is a partly sectional view of a cardan arm (in a locking condition) according to the present invention.
Figure 4:
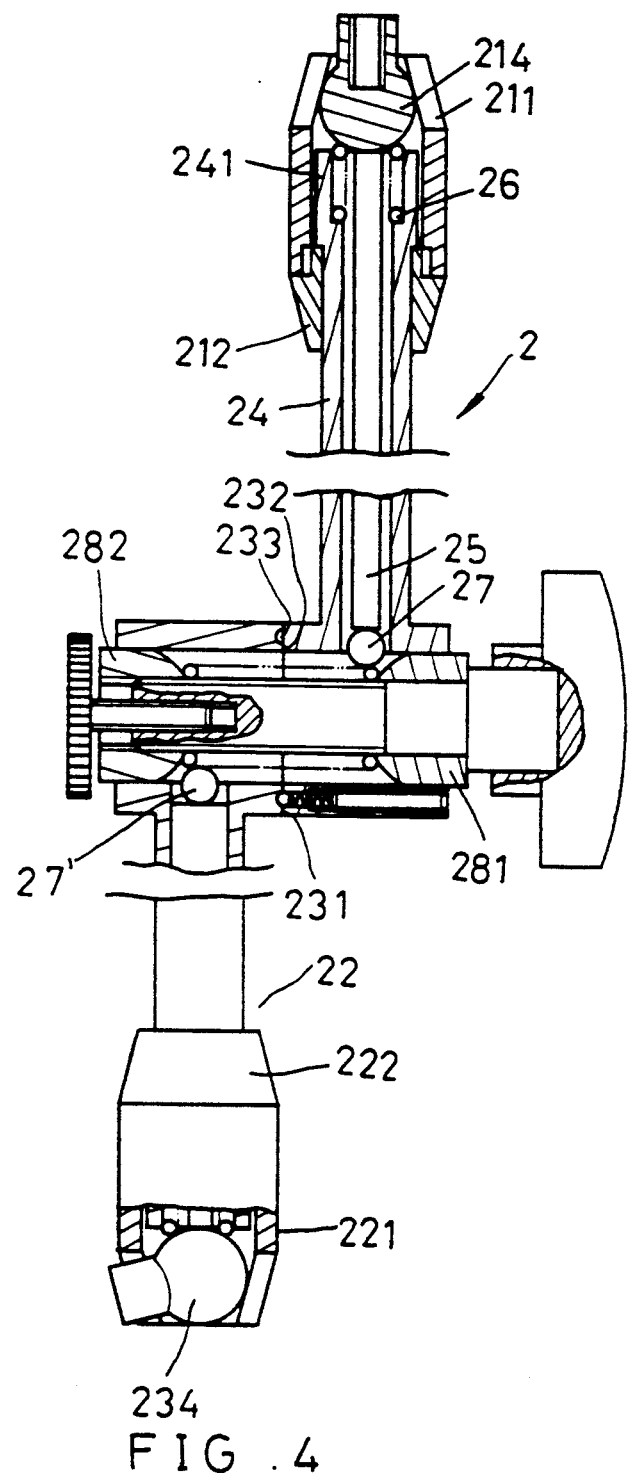
FIG. 4 is a partly sectional view of a cardan are (in a released condition) according to the present invention.

Referring to FIGS. 3 and 4, the two cardan arms 2, 3 are identical in structure and respectively for supporting the soldering iron 5 and the solder wire feeding unit 4, each of which is comprised of three joints 21, 22, 23 or 31, 32, 33, and one swivel knob 28 or 38. Since the two cardan arms 2, 3 are identical in structure, the cardan arm 2 for mounting the soldering iron 5 is taken as an example for structural illustration. As described, the cardan arm 2 comprises three joints 21, 22, 232, in which joints 21, 23 comprise each a sphere 214 or 234 therein and respectively fastened in a soldering iron holder 51 for holding the soldering iron 5, and the base 1; joints 21, 22 are respectively movably connected with joint 23 through an arm rod 24 and an actuating rod 25. The arm rod 24 comprises a circular projection 241 at the top with a spring 26 set therein and is inserted in ball socket 211 or 221 with the bottom edge 242 of its circular projection 241 stopped at the top surface 213 or 223 of ball socket 212 or 222. Actuating rod 25 is inserted in circular projection 241 with its two opposite ends respectively stopped against steel ball 27 or 27' and sphere 214 or 234. Steel ball 27 or 27' is set inside joint 23 to follow pressure block 281 or 282 to displace so that edges 231 and 232 are engaged with or disengaged from each other and actuating rod 25 is forced to engage with or disengage from sphere 214 or 234. One edge 231 of joint 23 comprises a plurality of recesses 233 and the opposite edge 232 of joint 23 comprises therein a compression spring 234 and a steel ball 235, in which the steel ball 235 is alternatively set in either of the recesses 233 according to the angular positioning of joint 23.

Figure 5:
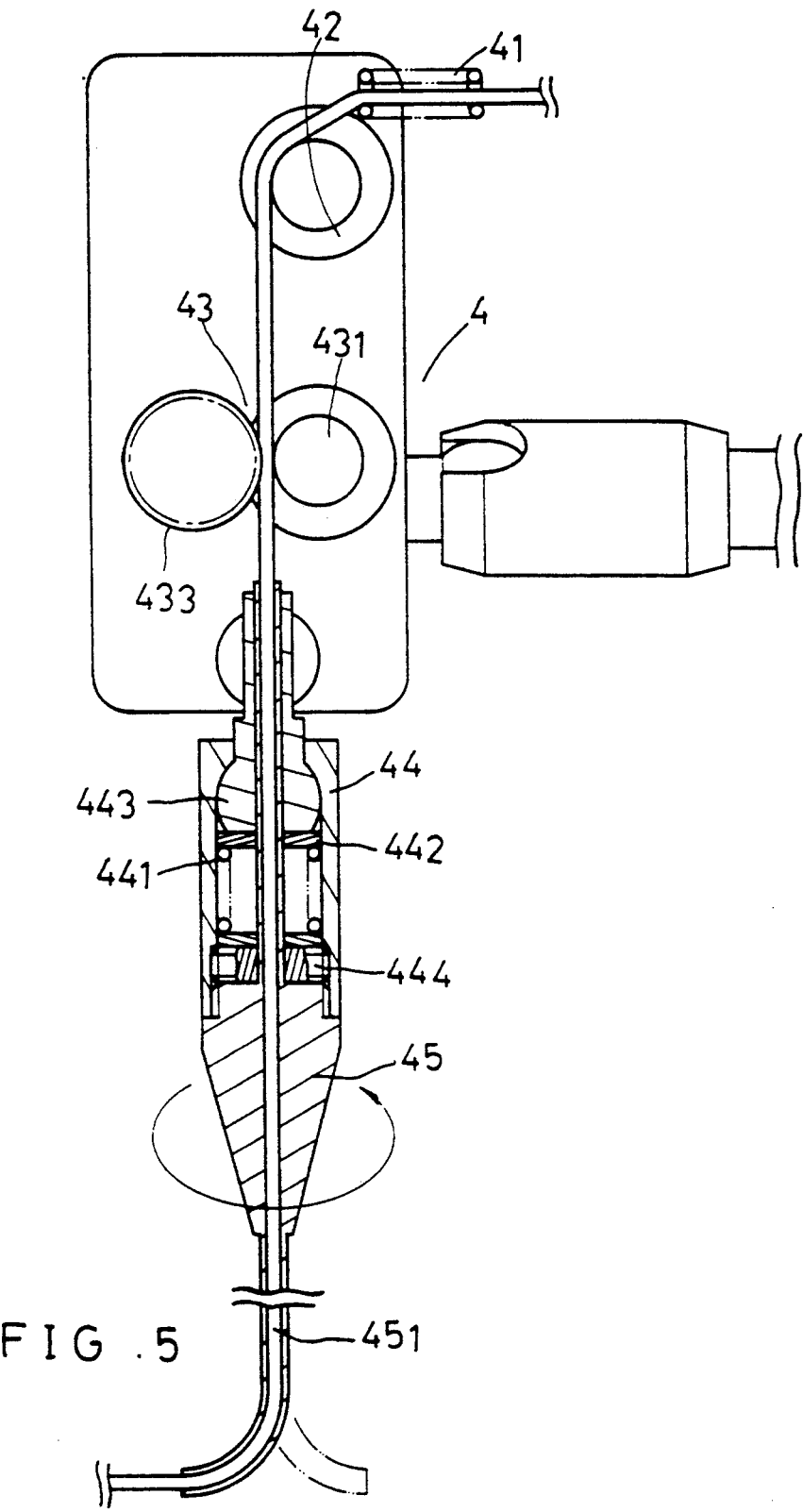
FIG. 5 is a partly sectional view of the solder wire feeding unit.
Figure 6:
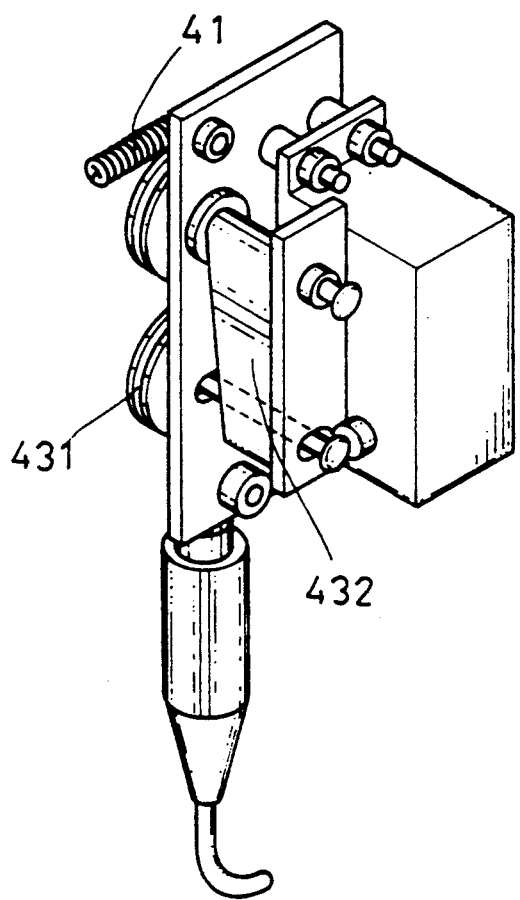
FIG. 6 is a side elevational view of the solder feeding unit.
Figure 7:
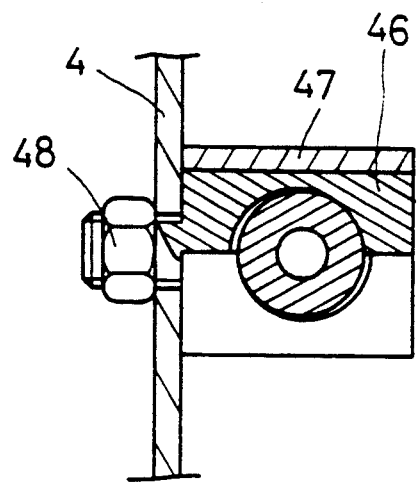
FIG. 7 is a sectional drawing illustrating the connection of the feeder holder to the solder feeding unit.

Referring to FIGS. 5 through 7, the solder wire feeding unit 4 comprises a guide spring 41 for adjustably guiding solder wire into a guide wheel 42. There is a DC motor transmission assembly 43 comprised of a pulley wheel 431, a plate spring 432 and a drive wheel 433. By means of the effect of the plate spring 432, the gap between the drive wheel 433 and the pulley wheel 431 is automatically controlled according to the thickness of a solder wire used and the coefficient of vibration during its transmission so that a solder wire can be accurately fed for soldering operation. There is a feeder holder 44 comprising therein a spring 441, a positioning means 442, a fastening element 443 and a screw rod 444. The screw rod 444 can be screwed inward and outward to squeeze or release the spring 441, so as to regulate the tightness of the connection between the fastening element 443 and the feeder holder 44. Therefore, the feeder holder 44 can be rotated axially to change the direction of the curved end 451 of the guide tube 452 which is retained inside a feeder head 45 which is fastened in the feeder holder 44 at the bottom. Referring to FIG. 7 with respect to the connection of the tube holder 44 with the solder wire feeding unit 4. The feeder holder 44 in inserted in a circular hole defined between an axle 46 and a sleeve 47 which are mounted on the solder wire feeding unit 4, and a lock nut 48 is fastened on the axle 46 to releasably control the positioning of the feeder holder 44 relative to the solder wire feeding unit 4.

FIG. 4 illustrates the joint 23 in a released condition, in which a gap is maintained between the two edges 231, 232 of the joint 23, the two actuating rods 25 are released from the two pressure blocks 241, 242 to move upward. Therefore, the joint 23 and the two spheres 214, 234 are loosely in contact with the two ball sockets 211, 221 and can be rotated freely relative to the two ball sockets 211, 221.

When the swivel knob 28 of the cardan are 2 is fastened inward, the ball sockets 211, 221 become firmly connected with the spheres 214, 234, and the joint 23 (see FIG. 4). Under this condition, the edges 231, 232 of the joint 23 are closely in contact with each other permitting the steel ball 235 to firmly set in one of the recesses 233, and the steel balls 27, 27' are respectively squeezed by the pressure blocks 241, 242 to force the actuating rods 25 to firmly stop against the spheres 214, 234. Because the spheres 214, 234 and the ball sockets 211, 221 are respectively firmly engaged together, and the two edges 231, 232 of the joint 23 are also firmly connected with each other, the cardan arm 2 becomes firmly positioned at a desired location and direction.

I claim:

1. A soldering system comprising a base, two cardan arms mounted on said base, a soldering iron assembly mounted on one of said cardan arms and a solder wire feeding unit mounted on the other of said arms, spool means for solder wire for said feeding unit carried by said base, each of said cardan arms comprising first, second and third joints and a swivel knob, said joints controlled to firmly connect together or release form one another by the swivel knob on said arm so as to adjust the positioning of said soldering iron and solder wire feeding unit, respectively, each arm further containing two mutually spaced apart pressure blocks a spring, two steel balls, two spheres and two actuating rods which form a stop against relative positioning of said three joints thereon responsive to rotation of the swivel knob on said arm, said second joint having said swivel knob mounted thereon and two parts releasably connected in series and having fastened therein said two pressure blocks with a steel ball adjacent each, one of said parts of said second joint connected by one of said rods to said first joint, and the other of said parts connected to said third joint by the other of said rods, each of said first and third joints having a sphere therein and an end of one of said arms set therein against said sphere and an opposite end of each rod set against one of said steel balls, said swivel knob being movable inward and outward relative to said second joint to change the space between said two pressure blocks, to engage and disengage said pressure blocks with said steel balls; and said solder wire feeding unit including means for regulating a flow of solder wire through said unit for controlling the speed and volume of the solder wire feeding therethrough.

2. A soldering system according to claim 1, wherein said solder wire feeding unit comprises a guide spring to flexibly guide a solder wire therein for soldering operation.

3. A soldering system according to claim 1, wherein said solder wire feeding unit comprises a feeder holder having a hollow screw rod revolvably fastened in a feeder head to hold a curved guide tube for feeding of solder wire so that the feeding direction of solder wire through said guide tube can be regulated by means of said hollow screw rod.

* * * * *